(12) United States Patent
Connor et al.

(10) Patent No.: US 8,233,581 B2
(45) Date of Patent: Jul. 31, 2012

(54) PROCESS FOR ADDING AN ORGANIC COMPOUND TO COOLANT WATER IN A PRESSURIZED WATER REACTOR

(75) Inventors: William Connor, North Huntingdon, PA (US); Rachel DeVito, Aspinwall, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 356 days.

(21) Appl. No.: 12/414,748

(22) Filed: Mar. 31, 2009

(65) Prior Publication Data

US 2010/0246746 A1    Sep. 30, 2010

(51) Int. Cl.
*G21C 9/00*    (2006.01)

(52) U.S. Cl. .......................... 376/306; 376/305; 376/277

(58) Field of Classification Search .................. 376/306, 376/305, 277
See application file for complete search history.

(56) References Cited

U.S. PATENT DOCUMENTS

| | | | | |
|---|---|---|---|---|
| 4,526,626 | A * | 7/1985 | Carter | 148/273 |
| 4,695,561 | A * | 9/1987 | Deitz | 502/401 |
| 5,904,991 | A * | 5/1999 | Hettiarachchi | 428/472.1 |
| 6,314,153 | B1 * | 11/2001 | Henzel et al. | 376/306 |
| 2002/0080906 | A1 * | 6/2002 | Andresen et al. | 376/306 |

* cited by examiner

*Primary Examiner* — Ricardo Palabrica

(57) ABSTRACT

The present invention relates generally to a process for a pressurized water reactor. The pressurized water reactor includes a primary circuit and a reactor core. The process includes adding a sufficient amount of an organic compound to coolant water passing through the primary circuit of the pressurized water reactor. The organic compound includes elements of carbon and hydrogen for producing elemental carbon.

18 Claims, No Drawings

PROCESS FOR ADDING AN ORGANIC COMPOUND TO COOLANT WATER IN A PRESSURIZED WATER REACTOR

BACKGROUND OF THE INVENTION

1. Field of the Invention

The present invention relates generally to a process for adding an organic compound to coolant water in a pressurized water reactor, and more particularly, for adding the organic compound to coolant water passing through a primary circuit of the pressurized water reactor.

2. Background of the Invention

Crud is the result of corrosion products formed when structural materials in the primary circuit, e.g., Reactor Coolant System (RCS), are exposed to coolant water, e.g., reactor coolant, during plant operation. These corrosion products are subsequently released into the coolant and can then deposit on the fuel in the reactor core. As core crud deposit thickness increases, heat transfer decreases as compared to the heat transfer of a clean surface. The temperature at the heat transfer surface will rise, increasing cladding corrosion. Minimizing fuel cladding corrosion is important to assure cladding integrity for all periods of plant operation. It is also an important consideration in fuel rod and reactor core design. Historically, significant effort has been expended in selection of corrosion resistant materials and in development of chemistry control additives and plant operating practices to minimize crud formation and crud deposition in the reactor core.

Crud induced power shift (CIPS) can occur when boron, which is present as boric acid, a reactor coolant additive used to control reactivity in a commercial nuclear power plant, such as, a pressurized water reactor (PWR), accumulates to sufficiently high concentrations within core crud deposits to suppress local neutron flux. This results in a shift in axial power distribution away from the boron deposits. The occurrence of CIPS during power operation at various commercial PWRs has been attributed to sufficiently thick, localized corrosion product deposits in the upper spans of a PWR core coincident with locations where the highest reaction steaming rates are predicted to occur. Locally thick crud deposits can also reduce heat transfer and increase fuel cladding temperatures which can lead to crud induced localized corrosion (CILC) and possibly fuel failures.

The injection of a soluble zinc additive to the reactor coolant of PWRs has been used for the purpose of radiation field reduction, general corrosion control, and primary water stress corrosion cracking (PWSCC) mitigation. In the PWR system, water is used as the reactor coolant. The water is circulated by pumps through-out a primary circuit, i.e., the RCS, that includes a pressure vessel which houses the heat generating reactor core, and a plurality of flow loops. The water in the primary circuit normally contains boric acid to control reactivity, hydrogen to provide reducing conditions, and an additive to maintain pH in a target control band. When "zinc addition" has been employed at a PWR, zinc acetate has been the preferred additive that is added to the reactor coolant. The use of zinc acetate was desirable because the acetate anion allowed for the zinc to be provided in a soluble form, and the anion and its decomposition products exhibited minimal or no detrimental effect on materials of construction in the RCS. The addition of zinc in the form of soluble zinc acetate has been utilized at a number of commercial PWR power plants.

As a result of adding zinc acetate to the reactor coolant of PWRs, desirable changes have been observed in ex-core shutdown radiation fields and various characteristics of core crud deposits. However, zinc acetate addition may result in various operation and/or design challenges. There is a desire to find a reactor coolant additive that can be added to the coolant water to produce elemental carbon. Further, there is a desire to find a reactor coolant additive that can condition core crud deposits. Moreover, there is a desire to find a reactor coolant additive to produce beneficial changes in the deposition and morphology of crud deposits without the potential challenges of known additives. Such an additive would be desirable for use in a wide variety of power plants, worldwide that utilize water reactor core designs.

Thus, it is further desired to develop a process for conditioning core crud deposits that results in core crud deposits having at least one of the following features: (i) a change in morphology, e.g., crud is finer grained and/or less well-crystallized, (ii) a change in deposition pattern, e.g., the crud is thinner and/or more uniformly distributed, (iii) a decrease in residence time, e.g., the crud has a shorter residence time on the core, and (iv) a change in composition, e.g., the crud has a higher carbon content. Furthermore, it is desired to develop a process that can inhibit CIPS, and/or CILC, and/or general cladding corrosion and/or fuel failures in water reactors.

SUMMARY OF THE INVENTION

In one aspect of the invention, a process for a pressurized water reactor having a primary circuit and reactor core is provided. The process includes adding a sufficient amount of an organic compound to coolant water passing through the primary circuit of the pressurized water reactor, the organic compound including elements of carbon and hydrogen, for producing elemental carbon.

The organic compound can further include elements selected from the group consisting of oxygen, nitrogen, and mixtures thereof.

The equivalent elemental carbon addition rate can be maintained in a range of from about 1 mg/hour to about 10 g/hour.

The water reactor can be a nuclear reactor. The coolant water can be in a reactor coolant system of a nuclear reactor.

The organic compound can be selected from the group consisting of organic acids, alcohols, amines, aldehydes, ketones, and mixtures thereof. The organic compound can be selected from the group consisting of acetic acid, methanol, ethanol, ethylamine, ethanolamine, and mixtures thereof. The organic compound can be substantially soluble.

The process can further include producing corrosion product deposits in the reactor core including elemental carbon in a range of from about 15 to about 20 percent by weight of the deposits.

The radiation level in the reactor core can be up to about 4000 Mrad/hour from gamma and neutrons. The hydrogen concentration in the reactor core can be greater than 0 cc/kg, or from about 25 to about 50 cc/kg.

The organic compound can be added on a continuous or batch basis.

The organic compound can be in a high purity form.

The process can further include producing corrosion product deposits in the reactor core wherein the elemental carbon is produced in an amount effective to change at least one of the morphology, deposition pattern, residence time and carbon content of crud deposits in the reactor core as a result of adding the organic compound.

The process can further include producing corrosion product deposits in the reactor core wherein the elemental carbon is produced in an amount effective to inhibit at least one of crud induced power shift, crud induced localized corrosion, cladding corrosion in the reactor core, and fuel failures as a result of adding the organic compound.

In another aspect of the invention, a process for a nuclear reactor having a primary circuit is provided. The process includes adding a sufficient amount of an organic compound to coolant water passing through the primary circuit of the nuclear reactor, the organic compound including elements of carbon and hydrogen, for producing elemental carbon.

The organic compound can further include elements selected from the group consisting of oxygen, nitrogen, and mixtures thereof.

The equivalent elemental carbon addition rate can be maintained in a range of from about 1 mg/hour to about 10 g/hour.

The nuclear reactor can be a pressurized water reactor.

In yet another aspect of the invention, a nuclear reactor having a reactor coolant system wherein the reactor coolant system contains reactor coolant circulating therethrough is provided. The reactor coolant includes an organic additive, the organic additive includes elements of carbon and hydrogen, and the organic additive being present in the reactor coolant in an amount sufficient to produce elemental carbon.

The organic compound can further include elements selected from the group consisting of oxygen, nitrogen, and mixtures thereof.

DETAILED DESCRIPTION OF THE INVENTION

As used herein and the claims, CIPS refers to a shift in core axial power which is greater than or equal to three percent (3%) of the predicted core axial power as a result of concentration/deposition of boron in corrosion product deposits in regions of the fuel undergoing sub-cooled nucleate boiling. Boron, which accumulates in thick corrosion product deposits in the reactor core, can cause local depressions in neutron flux that shifts power axially. This complicates control by the reactor operators, and in cases where CIPS is severe, may limit the plant to less than 100% rated power output. As core crud deposit thickness increases, the temperature at the heat transfer surface will rise, increasing general cladding corrosion. Locally thick crud deposits can lead to CILC and possibly fuel failures.

The process of the present invention relates to the addition of an organic compound to the coolant water of a pressurized water reactor. The coolant water passes through the primary circuit of the pressurized water reactor. The process may serve to modify the corrosion products (i.e., crud) that circulate in the coolant water and/or form films or deposits in the reactor core. Further, addition of the organic compound to the coolant water results in the production of elemental carbon (e.g., in the reactor core, primary coolant, and/or corrosion products therein). Without intending to be bound by any particular theory, it is believed that elemental carbon is produced from the additive by the combined effect of the high radiation levels in a reactor core when criticality is achieved and the dissolved hydrogen concentration in the reactor coolant. In an embodiment, the radiation levels in the core and the dissolved hydrogen concentration in the reactor coolant are each maintained in a range within industry standards for PWR operation. In another embodiment, the radiation level in an operating reactor core can be up to about 4000 Mrad/hour from both gamma and neutrons. In other embodiments, the dissolved hydrogen concentration in the reactor core can be greater than zero (0) cc/kg, or from about 25 to about 50 cc/kg.

It is further believed that the in-core radiation fields radiolytically decompose the organic molecule, and the reducing conditions produced by the hydrogen, present as an integral component of the nominal PWR chemistry control specifications, result in a portion of the free radical species arising from the organically bound carbon being deposited as elemental carbon. The addition of zinc acetate to the reactor coolant can lower ex-core radiation fields, slow both initiation and propagation of PWSCC in Alloy 600, and result in thinner, finer grained, more uniformly distributed core crud deposits with shorter core residence times and higher carbon content. In the present invention, the addition of an organic additive to the reactor coolant, e.g., in a sufficient amount to produce elemental carbon, can modify the morphology and deposition pattern of the core crud deposits to result in thinner, finer grained, less well-crystallized, more uniformly distributed core crud deposits with shorter core residence times and higher carbon content, with minimal or no impact on ex-core oxide films and without the addition of zinc.

In accordance with the present invention, an organic compound is added to the coolant water, such as reactor coolant, of a pressurized water reactor. Suitable organic compounds include those organic compounds known in the art which are made up of at least carbon and hydrogen. In an embodiment, the organic compound may also include nitrogen, oxygen, and mixtures thereof. Thus, in alternate embodiments, organic compounds for use in the present invention can include those containing at least carbon and hydrogen, or at least carbon, hydrogen, and oxygen, or at least carbon, hydrogen, and nitrogen, or at least carbon, hydrogen, oxygen, and nitrogen. In a preferred embodiment, the additive is miscible with, or substantially soluble in, the coolant water. However, even immiscible or only slightly soluble organic additives can be used wherein less control of the addition rate is acceptable. Non-limiting examples of suitable organic compounds for use in the present invention can include organic acids such as, but not limited to, acetic acid, alcohols such as, but not limited to, methanol and ethanol, aldehydes, amines, ketones, and mixtures thereof. Other non-limiting examples can include soluble or slightly soluble organic compounds that contain at least carbon and hydrogen, and optionally oxygen, such as but not limited to, ethylacetate, and/or optionally nitrogen, including organic amines such as, but not limited to ethylamine and ethanolamine. In an embodiment, high purity forms of the organic compound are used consistent with standard industry practice of limiting impurities to as low as reasonably achievable (ALARA) in any additive to the reactor coolant of a PWR.

The organic compound can be added to the coolant water using a variety of conventional mechanisms known, such as, for example but not limited to, injection. The addition can be conducted, for example, on a batch or a continuous basis. In a non-limiting embodiment, the organic compound is continuously injected into the reactor coolant. Further, in a non-limiting embodiment, the injection can be employed during power operation. The organic compound is injected into the reactor coolant at a rate sufficient to produce elemental carbon. In an embodiment, the rate of injection of the organic compound is sufficient to produce elemental carbon in an amount that is effective to change the morphology and deposition pattern of the core crud deposits as previously described herein. In one embodiment, the organic compound is injected into the reactor coolant at a rate sufficient to provide an equivalent elemental carbon addition rate maintained in the range of from about 1 mg/hour to about 10 g/hour. Injection of the organic compound at a rate within this specified range can be sufficient to produce corrosion product deposits in the reactor core that contain elemental carbon in the range of from about 15 to about 20 percent by weight of the deposits.

Without intending to be bound by any particular theory, it is believed that the deposition of elemental carbon on the reactor core cladding and on developing core crud deposits favorably affects the morphology and deposition pattern of the core crud deposits such as to reduce the risk of CIPS/CILC occurring and/or to reduce general fuel cladding corrosion and fuel failures. It is further believed that the presence of the organic additive serves to condition and control the core crud retention and release to minimize the potential for CIPS/CILC and to reduce general fuel cladding corrosion and fuel failures. For example, during power operation, the injection of an organic compound into the reactor coolant at a rate that is effective to to produce elemental carbon in an effective amount, or at an effective rate, or in a predetermined specified range, can produce core corrosion product deposits having at least one desirable characteristic such as, for example but not limited to, (i) a change in morphology, e.g., crud is finer grained and/or less well-crystallized, (ii) a change in deposition pattern, e.g., the crud is thinner and/or more uniformly distributed, (iii) a decrease in residence time, e.g., the crud has a shorter residence time on the core, and (iv) a change in composition, e.g., the crud has a higher carbon content. These changes are as compared to core corrosion product deposits produced under nominal PWR reactor coolant chemistry operating conditions.

Zinc Acetate Addition Evaluations

Zinc acetate addition has been employed at an increasing number of PWRs to lower ex-core radiation fields and to provide PWSCC protection to austenitic stainless steel and nickel based alloys that are used both in construction of the pressure boundary of the RCS and structural components within the RCS as discussed in *Pressurized Water Reactor Primary Water Zinc Application Guidelines*. EPRI, Palo Alto, Calif.: 2006. 1013420. Following the initial use of zinc addition at Plant A during Cycle 10, visual examination of the core during the refueling outage showed a uniform-appearing black deposit over the full height of the fuel assemblies as described in *Evaluation of Zinc Addition to the Primary Coolant of PWRs*. EPRI, Palo Alto, Calif.: October 1996. TR-106358, Vol. 1. Measurements made on samples of crud removed from these fuel assemblies by scraping showed that the crud deposits were extremely thin (<0.5 μm) compared to previous operating cycles at this plant, even in the hottest spans where maximum sub-cooled nucleate boiling was predicted and maximum crud thickness was normally observed. The visual appearance of this crud was described as highly unusual.

The Plant A Cycle 10 fuel deposits were also described as different from fuel crud deposits formed on cores where zinc acetate addition had not been used. It was noted that the sooty-looking deposits could be easily removed by the sampling tool and were not nearly as tenacious as crud on cores where zinc acetate addition was not used. Residence time calculations for this crud showed that these deposits remained on the core about half as long as crud from this plant in the previous cycle of operation when zinc acetate was not added.

A study was conducted as described in *Evaluation of Fuel Clad Corrosion Product Deposits and Circulating Corrosion Deposits in PWRS*, EPRI, Palo Alto, Calif., and Westinghouse Electric Company, Pittsburgh, Pa.: 2004. 1009951, where core crud deposits from nine operating commercial PWRs were removed, analyzed, and compared. One of the nine PWRs, Cycle 11 at Plant B, was operating with zinc acetate addition to the RCS. The core crud deposits for this plant were found to contain carbon and were described as thinner, less crystalline, and more mobile when compared to core crud for plants not adding zinc acetate. The morphology of the core crud deposits at Plant B after Cycle 11 was further described as sub-micron in size and having no display of distinct crystal faces. This observation was in marked contrast to the morphology of core crud deposits at the plants that did not add zinc acetate. The morphology of core crud at the plants not adding zinc acetate was described as consisting of well-crystallized micron-sized particles.

As described in Evaluation of Fuel Cladding Corrosion and Corrosion Product Deposits from Callaway Cycle 13: Results of Poolside Examinations Following One Cycle of Zinc Addition. EPRI, Palo Alto Calif.: 2005. 1011088, core crud examinations at Plant C after Cycle 13, the initial cycle of operation with zinc acetate addition to the RCS, were also conducted. The post-zinc acetate addition core crud deposits were compared to pre-zinc acetate core deposits at this same plant and were described as being different in chemical composition and deposit morphology, thinner, more widely distributed over the core, less activated, and more easily released upon shutdown.

The following results of the second cycle of zinc acetate addition at Plant C were described in Evaluation of Fuel Cladding Corrosion and Corrosion Product Deposits from Callaway Cycle 14: Results of Poolside Measurements Following Two Cycles of Zinc Addition. EPRI, Palo Alto, Calif., 2006. 1013425. In the core crud examination after Cycle 14, it was noted that carbon was an elemental component of the core crud deposits. The transition to crud that was less activated (i.e., lower specific activity and lower residence time) during Cycle 13 had continued in Cycle 14.

In addition to examination of fuel crud deposits, cladding corrosion measurements were also performed at a number of plants before and after implementing zinc acetate addition. Plants operating with zinc acetate addition had lower oxide thickness measurements, on average, than plants operating without zinc acetate addition. The actual measured values could also be compared to the oxide thickness as predicted based on corrosion models. Plant D experienced corrosion consistent with the predictions prior to adding zinc acetate, whereas fuel rods which had been exposed to zinc acetate experienced less corrosion than predicted.

Thus, examination of fuel from PWR power plants which add zinc acetate has shown beneficial changes in crud such as, for example but not limited to, thinner core crud deposits, shorter residence time of core crud deposits, higher carbon content of core crud deposits, and finer grained, less well-crystallized core crud deposits.

In accordance with the present invention, beneficial changes in crud can be attained by adding to the coolant water of a pressurized water reactor an organic compound which is made up of at least carbon and hydrogen, but optionally may also include oxygen, nitrogen, and mixtures thereof. In an embodiment, the pressurized water reactor is a nuclear reactor. In a further embodiment, the nuclear reactor includes reactor coolant circulating through the Reactor Coolant System (RCS). Addition of the organic compound additive can condition core crud deposits. Further, the organic additive can produce beneficial changes in the deposition and morphology of crud deposits. The resultant core crud deposits can have at least one of the following features: (i) a change in morphology, e.g., crud is finer grained and/or less well-crystallized, (ii) a change in deposition pattern, e.g., the crud is thinner and/or more uniformly distributed, (iii) a decrease in residence time, e.g., the crud has a shorter residence time on the core, and (iv) a change in composition, e.g., the crud has a higher carbon content. It is believed that these beneficial changes in core crud are effective to inhibit CIPS, and/or CILC, and/or general fuel cladding corrosion, and/or fuel failures.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

The invention claimed is:

1. A process for introducing a reactor coolant additive in a pressurized water reactor having a primary circuit, a reactor core and reactor coolant water passing through the primary circuit, to produce elemental carbon, comprising:
    adding a sufficient amount of the reactor coolant additive to the reactor coolant water passing through the primary circuit of the pressurized water reactor, the reactor coolant additive being an organic compound selected from the group consisting of:
        elements of carbon and hydrogen,
        elements of carbon, hydrogen and nitrogen,
        elements of carbon, hydrogen and oxygen, and
        elements of carbon, hydrogen, nitrogen and oxygen,
    wherein said reactor coolant water excludes the presence of inorganic compounds with the exception of a sufficient amount of boric acid to control reactivity, hydrogen to provide reducing conditions, an additive to maintain pH in a target control band and trace elements naturally occurring in water.

2. The process of claim 1, wherein the equivalent elemental carbon addition rate is maintained in a range of from about 1 mg/hour to about 10 g/hour.

3. The process of claim 1, wherein the reactor coolant water is in a reactor coolant system of a nuclear reactor.

4. The process of claim 1, wherein the organic compound is selected from the group consisting of organic acids, alcohols, amines, aldehydes, ketones, and mixtures thereof.

5. The process of claim 1, wherein the organic compound is selected from the group consisting of acetic acid, methanol, ethanol, ethylamine, ethanolamine, and mixtures thereof.

6. The process of claim 1, wherein the organic compound is substantially soluble.

7. The process of claim 1, further comprising producing corrosion product deposits in the reactor core comprising elemental carbon in a range of from about 15 to about 20 percent by weight of the deposits.

8. The process of claim 1, wherein a radiation level in the reactor core is up to about 4000 Mrad/hour from gamma and neutrons.

9. The process of claim 1, further comprising maintaining a hydrogen concentration in the reactor core of greater than 0 cc/kg.

10. The process of claim 1, further comprising maintaining a hydrogen concentration in the reactor core of from about 25 to about 50 cc/kg.

11. The process of claim 1, wherein adding the organic compound is on a continuous basis.

12. The process of claim 1, wherein adding the organic compound is on a batch basis.

13. The process of claim 1, wherein the organic compound is in a high purity form consistent with standard nuclear industry practice of limiting impurities to as low as reasonably achievable (ALARA) for any additive to the coolant water of the pressurized water reactor.

14. The process of claim 1, further comprising producing corrosion product deposits in the reactor core wherein the elemental carbon is produced in an amount effective to change at least one of the morphology, deposition pattern, residence time, and carbon content of crud deposits in the reactor core as a result of adding the organic compound.

15. The process of claim 1, further comprising producing corrosion product deposits in the reactor core wherein the elemental carbon is produced in an amount effective to inhibit at least one of crud induced power shift, crud induced localized corrosion, cladding corrosion in the reactor core, and fuel failures as a result of adding the organic compound.

16. A process for introducing a coolant water additive to produce elemental carbon in a nuclear reactor having a primary circuit, comprising:
    adding a sufficient amount of the coolant water additive to coolant water passing through the primary circuit of the nuclear reactor, the coolant water additive being an organic compound selected from the group consisting of:
        elements of carbon and hydrogen,
        elements of carbon, hydrogen and nitrogen,
        elements of carbon, hydrogen and oxygen, and
        elements of carbon, hydrogen, nitrogen and oxygen,
    wherein said reactor coolant water excludes the presence of inorganic compounds with the exception of a sufficient amount of boric acid to control reactivity, hydrogen to provide reducing conditions, an additive to maintain pH in a target control band and trace elements naturally occurring in water.

17. The process of claim 16, wherein the equivalent elemental carbon addition rate is maintained in a range of from about 1 mg/hour to about 10 g/hour.

18. The process of claim 16, wherein the nuclear reactor is a pressurized water nuclear reactor.

* * * * *